US008005081B2

(12) United States Patent
Bragg et al.

(10) Patent No.: US 8,005,081 B2
(45) Date of Patent: Aug. 23, 2011

(54) EVOLUTION OF ETHERNET NETWORKS

(75) Inventors: Nigel Bragg, Weston Colville (GB); David Allan, Ottawa (CA); Simon Parry, Bishops Stortford (GB); Robert Friskney, Harlow (GB); Simon Brueckheimer, London (GB)

(73) Assignee: Nortel Networks Limited, Mississauga, Ontario (CA)

( * ) Notice: Subject to any disclaimer, the term of this patent is extended or adjusted under 35 U.S.C. 154(b) by 818 days.

(21) Appl. No.: 11/962,476

(22) Filed: Dec. 21, 2007

(65) Prior Publication Data

US 2009/0161669 A1      Jun. 25, 2009

(51) Int. Cl.
*H04L 12/28* (2006.01)

(52) U.S. Cl. ........ 370/389; 370/256; 370/390; 370/422; 370/395.5

(58) Field of Classification Search .................. 370/256, 370/389, 422
See application file for complete search history.

(56) References Cited

U.S. PATENT DOCUMENTS

| 2005/0220096 | A1* | 10/2005 | Friskney et al. | 370/389 |
| 2007/0019642 | A1 | 1/2007 | Lu et al. | |
| 2007/0076719 | A1 | 4/2007 | Allan et al. | |
| 2008/0170583 | A1* | 7/2008 | Sultan et al. | 370/422 |
| 2010/0118740 | A1* | 5/2010 | Takacs et al. | 370/256 |

FOREIGN PATENT DOCUMENTS

WO   2005099183 A1   10/2005

OTHER PUBLICATIONS

International Search Report and Written Opinion dated Apr. 7, 2009 for International Application No. PCT/CA2008/002234, International Filing Date Dec. 19, 2008 (13 pages).
Allan et al, "Ethernet as carrier transport infrastructure" Communications Magazine, IEEE, Feb. 2006, pp. 95-101, vol. 44, Issue 2.
TPack, "PBB-TE, PBT: Carrier Grade Ethernet Transport", Jun. 2007, version 2, p. 6, right-hand column, line 11, p. 10, left-hand column, line 19, figs. 2, 4. <http://www.tpack.com/fileadmin/user_upload/Public_Attachment/PBT_WP_v2_web.pdf>.

* cited by examiner

*Primary Examiner* — Dang T Ton
*Assistant Examiner* — Mohamed Kamara
(74) *Attorney, Agent, or Firm* — Christopher & Weisberg, P.A.

(57) ABSTRACT

An Ethernet network comprises nodes which support a plurality of different forwarding modes. A range of VLAN Identifiers (VIDs) are allocated to each of the forwarding modes. Connections are configured between a source node and a destination node of the network using different forwarding modes. Packets carrying data traffic are sent to the destination node by selectively setting a VID in a packet to a first value, to transfer a packet via a first connection and a first forwarding mode, and a second value to transfer a packet via the second connection and the second forwarding mode. Packets received from both of the connections and sent on to an end-user. VLAN Identifiers can be allocated to different releases of functionality at nodes (e.g. software releases) such that packets are forwarded via a set of nodes supporting a first release, or via a set of nodes supporting a second release. It is possible to provide a controlled and disruption-free network evolution.

19 Claims, 5 Drawing Sheets

EVOLUTION OF ETHERNET NETWORKS

FIELD OF THE INVENTION

This invention relates to evolving Ethernet networks.

BACKGROUND TO THE INVENTION

There is significant interest in using Ethernet switches in carrier networks. Use of Ethernet switches in carrier networks has the advantages of interoperability (mappings between Ethernet and other frame/packet/cell data structures such as IP, Multiprotocol Label Switching (MPLS) and Internet Engineering Task Force (IETF) Pseudowires are well known) and economy (Ethernet switches are relatively inexpensive compared to IP routers, for example).

Two notable technologies which allow the use of Ethernet switches in carrier networks are Provider Backbone Bridges (PBB) and Provider Backbone Bridge Traffic Engineering (PBB-TE). Provider Backbone Bridges (PBB), also known as Mac-in-Mac, is described in the Institute of Electrical and Electronics Engineers (IEEE) standard 802.1ah. PBB is a technology which allows for layering of the Ethernet network into customer and provider domains with complete isolation between their MAC addresses. In this way, a customer's traffic can be carried transparently across a carrier's Ethernet network. Nortel has proposed a form of 'Connection-oriented Ethernet' (CoE) which is described in International Patent Application WO 2005/099183 and in the paper "Ethernet as Carrier Transport Infrastructure", David Allan, Nigel Bragg, Alan McGuire, Andy Reid, IEEE Communications Magazine February 2006. This technology is being standardized by the IEEE as IEEE 802.1Qay under the descriptor Provider Backbone Bridge Traffic Engineering (PBB-TE). In a PBB-TE network, the conventional Ethernet processes of 'flooding' and 'learning' are disabled and, instead, managed traffic paths are set up across the network of Ethernet switches. A network manager in the control plane instructs each Ethernet switch along a path to store forwarding information. The switch uses the forwarding information to forward received data frames. The forwarding information relates to a particular combination of identifiers in a data frame, the VLAN Identifier (VLAN ID or VID) and the destination MAC address (DA) in the case of Ethernet. As traffic is now constrained to follow pre-determined paths through the network, this allows network operators to perform traffic engineering on the Ethernet network, such as planning working and protection paths having diverse routes through the network and provisioning additional trunks to increase capacity. International Patent Application WO 2005/099183 describes moving packets between different planned PBB-TE paths, such as a working path and a protection path, by changing the VLAN ID in the header of the traffic packets.

Nortel has proposed a further Ethernet technology known as Provider Link State Bridging (PLSB) which is particularly suited to any-to-any services. In PLSB, the Intermediate System to Intermediate System (IS-IS) link state routing protocol is used to learn and distribute network topology information among Ethernet switches in a network, rather than using conventional Ethernet protocols such as spanning tree.

WO 2005/099183 describes the possibility of a mixed-mode network in which conventional Ethernet, bridged Ethernet (IEEE 802.1Q) and PBB-TE forwarding modes can co-exist simultaneously. The VLAN ID space is partitioned so that a first VLAN ID range (e.g. 1-2048) is assigned to conventional mode Ethernet forwarding and operates using VLAN-aware spanning tree protocol and auto address learning and another part of the address space (e.g. VLAN IDs 2049-4096) is assigned to PBB-TE. In this way, logically separate forwarding modes exist on the same physical network.

In a live network there is often a need to make changes to connections that have been set up for customers. It has been found that, in a mixed-mode network, there can be a need to migrate customers between connections which operate according to different types of forwarding mode, such as migrating from PBB to PBB-TE. This need can arise at short notice, and can require significant changes to be made to a live network to accommodate the needs of customers. It is desirable that any alterations made to a live network result in short or, ideally, no periods of outage. There is also a need to update functionality (e.g. by installing a new software release) at nodes of a live network with minimal disruption to customer traffic. Although software is tested before installation in a live network, it is not possible to test for every possible scenario and therefore it is not possible to guarantee what effects the new software release will have on live customer traffic.

The present invention seeks to provide an improved way of evolving a network which addresses at least one of the evolution scenarios outlined above.

SUMMARY OF THE INVENTION

A first aspect of the present invention provides a method of transferring packets across an Ethernet network comprising a plurality of nodes, the network supporting a plurality of different forwarding modes, the method comprising:

allocating a range of VLAN Identifiers (VIDs) to each of the forwarding modes, each forwarding mode making a different use of a VID within a header of a packet;

configuring a first connection between a source node and a destination node of the network using a first forwarding mode and a VID in the packet having a first value selected from a first range of VIDs;

configuring a second connection between the source node and the destination node of the network using a second forwarding mode and a VID in the packet having a second value selected from a second range of VIDs;

sending packets carrying data traffic to the destination node by selectively: setting a VID in a packet to the first value, to transfer the packet via the first connection and the first forwarding mode; and, setting a VID in a packet to the second value to transfer the packet via the second connection and the second forwarding mode; and, receiving, at the destination node, packets from the first and second connections, and sending packets received from both connections on to an end-user.

A related aspect of the invention provides a method of transferring packets across an Ethernet network comprising a plurality of nodes, the network supporting a plurality of different forwarding modes, wherein a range of VLAN Identifiers (VIDs) has been allocated to each of the forwarding modes, each forwarding mode making a different use of a VID within a header of a packet, the method comprising, at a first node:

receiving a first association between a service identifier for data traffic and a VID having a first value corresponding to a first forwarding mode;

receiving a second association between the service identifier for data traffic and a second VID having a second value corresponding to a second forwarding mode; and, selectively sending packets carrying data traffic to the destination node by setting a VID in the packet to the first value, to transfer the packet via a first connection using the first forwarding mode, and setting a VID in a packet to the second value to transfer the packet via a second connection using the second forwarding mode.

A second aspect of the present invention provides a method of transferring packets across an Ethernet network comprising a plurality of nodes, the method comprising:

configuring a first connection between a source node and a destination node of the network via a first set of nodes of the network, the first set of nodes using a first release of functionality to implement a packet forwarding mode, the first connection being allocated a VLAN Identifier (VID) having a first value;

installing a second release of the functionality to implement the packet forwarding mode at at least one node of a second set of nodes;

configuring a second connection between the source node and the destination node of the network via the second set of the nodes of the network, the connection being allocated a VLAN Identifier (VID) having a second value;

sending packets to the destination node by selectively setting a VID in the packet to the first value, to transfer the packet via the first connection, and setting a VID in a packet to the second value to transfer the packet via the second connection.

receiving, at the destination node, packets from the first and second connections, and sending packets received from both connections on to an end-user.

Both aspects of the invention help to permit a controlled and disruption-free achievement of network evolution. In the first aspect of the invention, the network evolution is in the form of moving traffic to a new connection which uses a different forwarding mode. In the second aspect of the invention, the network evolution is in the form of moving traffic to a connection through a set of nodes which use a different release of functionality at network nodes, such as different software releases.

The term "connection" has been used to generally represent both any-to-any connectivity and point-to-point connections. It will be apparent to those skilled in the art that the invention applies to the migration of services between forwarding modes which support any-to-any (LAN segment) connectivity (e.g. PBB to PLSB) as well as to migration of strictly point-to-point connections as supported by PBB-TE to another forwarding mode.

A connection between two endpoints is defined by the MAC addresses of the endpoints (which are strictly interface identifiers), and a single VID in the case of PBB, optionally a pair of VIDs, one in each direction, in the case of PBB-TE. The MAC addresses alone unambiguously define the endpoints of the connection. The VID(s) define the route and method by which the packets travel between the endpoints. For example, in PBB, the VID defines the topology over which the Spanning Tree protocol operates to generate a single possible path between the endpoints. In PBB-TE, the path is defined by explicit configuration of forwarding tables.

A new connection can be configured, and validated, on a network infrastructure before carrying any live user traffic. A simple change of the VID value applied to packets at the source node ensures that traffic is sent along one of the connections and has the advantage that there is no need for synchronization between end-point nodes and/or service instances during migration of traffic. In other words, it is possible to "make-before-break". User traffic is switched losslessly between alternative connections between the two endpoints (i.e. each packet for transport over the network is always allocated either a VID value for the first connection or a VID value for the second connection; no packets are lost) and can be switched hitlessly for a modest differential delay between the old and new connections.

Currently, the main forwarding modes of interest are Provider Backbone Bridging (PBB), Provider Backbone Bridging-Traffic Engineering (PBB-TE) and Provider Link State Bridging (PLSB). In the future, it is expected that other forwarding modes will be developed, and the present invention can be extended to include future forwarding modes which make different uses of the VID field.

The functionality described here can be implemented in software, hardware or a combination of these. The invention can be implemented by means of a suitably programmed computer or any other form of processing apparatus. Accordingly, the invention also provides a network node of an Ethernet network comprising a processor which is configured to perform any of the methods. Another aspect of the invention provides software for implementing any of the described methods. The software may be stored on an electronic memory device, hard disk, optical disk or any other machine-readable storage medium. The software may be delivered as a computer program product on a machine-readable carrier or it may be downloaded to a node or network management entity via a network connection.

BRIEF DESCRIPTION OF THE DRAWINGS

Embodiments of the invention will be described, by way of example only, with reference to the accompanying drawings in which.

DESCRIPTION OF PREFERRED EMBODIMENTS

Figure 1:
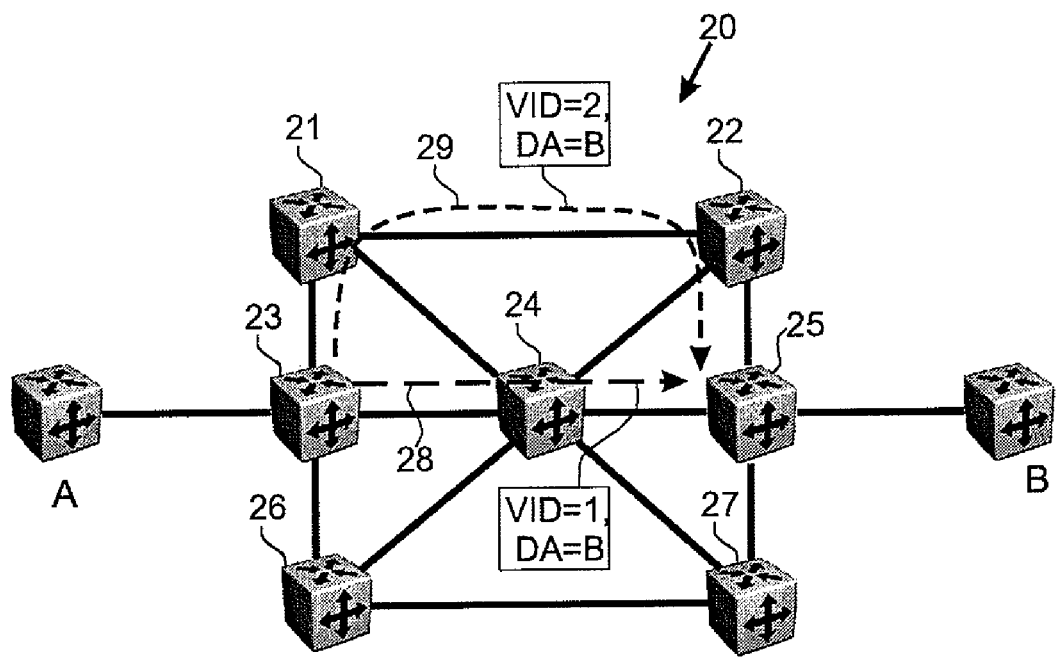
FIG. 1 shows an example carrier network in which PBB-TE connections have been configured to provide a working path and a protection path.

FIG. 1 shows an arrangement of Ethernet switches and communications links forming a carrier network. In this simple network the carrier network 20 comprises Ethernet switches 21-27. Switches A and B are shown connecting to switches 23, 25 of the network 20. Switches A, B can represent customer switches, or aggregation switches in the outlying part of a carrier or customer network. The carrier Ethernet network 20 provides connectivity between customer sites and can represent a Provider Backbone Bridge Network (PBBN) as defined in IEEE 802.1ah—Virtual Bridged Local Area Networks: Provider Backbone Bridges. According to IEEE 802.1ah a Provider Backbone Bridge Network (PBBN) can interconnect multiple Ethernet networks, one type of which is Provider Bridge Networks (PBN) of the type defined in IEEE 802.1ad. Each Ethernet network is typically a network belonging to an enterprise or another operator.

The carrier edge switches 23, 25 may be logically separated into a single Provider Edge- (PE-) Core and one or more PE-Edge functions. The PE-Edge is the ingress/egress point at which customer traffic enters or leaves the carrier network 20. The PE-Edge preferentially encapsulates incoming Ethernet traffic from the customer using Media Access Control (MAC) in MAC encapsulation and forwards the encapsulated traffic across the carrier network 20. The PE-Core function performs forwarding based only on the provider address space (the B-MAC and B-VID fields), which allows encapsulated traffic to transit the PE switch. This embodiment is preferred as a mechanism to limit the number of table entries required because only the MAC address space of the carrier network need be recognized, and not the whole of the customer's MAC address space, which could be changed independently. Similarly, the PE-Edge decapsulates (strips) outgoing Ethernet traffic and forwards the stripped traffic on to the customer via the appropriate interface. VLAN tags are often used to provide customer separation at the logical PE-Edge with each different customer site connected to each edge switch having a unique VLAN tag. Stacked VLAN (i.e. VLAN-in-VLAN encapsulation or Q-in-Q) may be used to protect any VLAN tags used by the customer traffic. For example, customer switch A may send Ethernet traffic over a communications link to the logical PE-Edge of edge switch 23. Logical PE-Edge of edge switch 23 encapsulates each Ethernet frame in a further Ethernet frame using the MAC address of the ingress port on edge switch 23 as the source address and the MAC address of the appropriate egress point—in this case a port on edge switch 25—as the destination address. The encapsulated traffic is forwarded across a connection via node 24 of carrier network 20 to edge switch 25. Connections may be typically trunked in the sense that traffic from multiple customers will be routed through the same connection. Alternatively, those skilled in the art will appreciate that separate connections could be used for each customer. At the PE-Edge of edge switch 25, the original frames are stripped of their encapsulation and sent over a communications link to customer switch B.

FIG. 1 shows a customer switch A connecting to a single node 23 of the carrier network but it may also be dual-homed on two nodes, such as nodes 21 and 23, for improved resiliency.

FIG. 1 shows how two PBB-TE connections can be defined between nodes 23, 25, in the manner described in WO 2005/099183. A working path 28 follows a route via nodes 23, 24 and 25. A protection path 29 follows a route via nodes 23, 21, 22, 25. In accordance with PBB-TE, each connection 28, 29 is defined by a combination of a backbone VLAN Identifier (B-VID) value and the backbone destination address (B-DA). The working left-to-right path is defined by B-VID=1, B-DA=25 and the protection path is defined by B-VID=2, B-DA=25. The equivalent right-to-left paths (not shown) are defined by B-DA=23. Their B-VID values could be 1 and 2 as for the left-to-right paths, but need not be, and may be assigned by the management system to any pair of different values within the PBB-TE B-VID range. Each switch stores state in a forwarding table to cause traffic to be forwarded along these routes.

Figure 2:
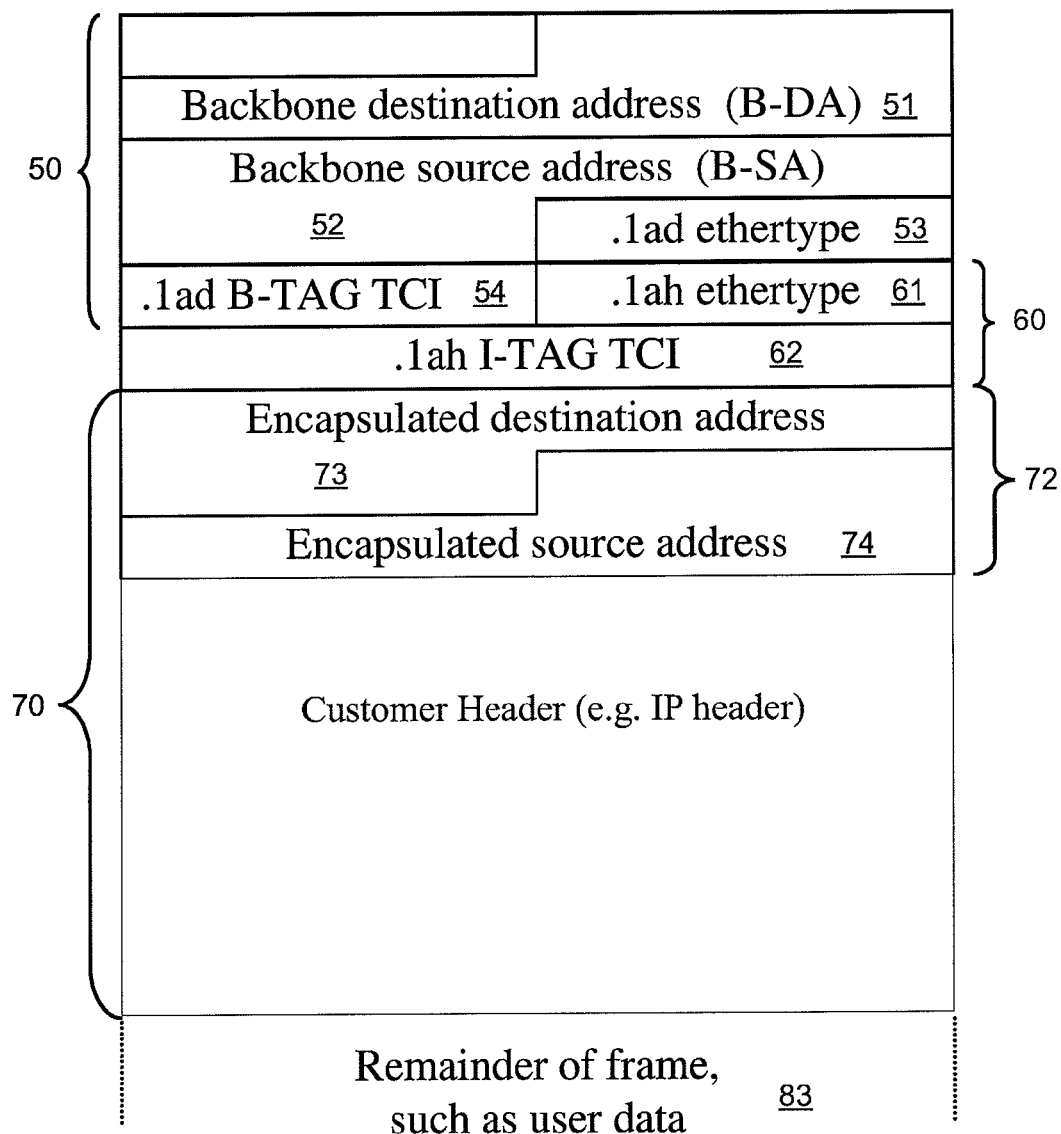
FIG. 2 shows the format of a header of a PBB data packet.

The format of a MAC-in-MAC data frame is shown in FIG. 2. The data frame begins with a header which comprises a backbone header 50, an IEEE 802.1ah encapsulation header 60 and the header 70 of the customer data frame. The header 70 of the customer data frame comprises an Ethernet header 72, followed by whatever protocol is identified by the Ethertype in the header. The backbone header 50 begins with the Backbone Destination Address (B-DA) 51 and Backbone Source Address (B-SA) 52. These addresses will correspond to addresses of a port at which the traffic enters the core network (e.g. a port of switch 23 in FIG. 1) and leaves the core network (e.g. a port of switch 25 in FIG. 1). Alternatively, the addresses may identify the whole PE entity, when the I-TAG field (see below) is used within the PE to unambiguously identify the customer port. An IEEE 802.1ad Ethertype field 53 precedes an IEEE 802.1ad B-TAG TCI field 54 which includes a VLAN tag, also known as a B-VID (Backbone VLAN Identifier). This is used by the backbone (core) network 20 to route the encapsulated frame within the provider network 20. In FIG. 1, the paths 28, 29 between nodes 23, 25 will be identified by a particular value of the B-VID field within the B-TAG. Next, the IEEE 802.1ah encapsulation header 60 comprises an IEEE 802.1ah Ethertype field 61, which declares that the frame is of type MAC-in-MAC. This is followed by a four byte Extended Service VLAN Tag (I-TAG) field 62, which uniquely identifies the individual customer service within the carrier network. Finally, the header carries the header of the encapsulated customer data frame 70. This begins with the encapsulated Ethernet header 72, which comprises an encapsulated Destination Address 73 and an encapsulated Source Address 74. These addresses correspond to addresses of the customer/end-user and can correspond, for example, to switches A, B in FIG. 1. The customer data frame can take many forms, such an IP data frame with IP and UDP headers.

Different forwarding modes (PBB, PBB-TE, PLSB) each make different use of the elements within the header shown in FIG. 2. These different modes will now be summarized:

In a PBB forwarding mode, nodes of the carrier network 20 will use a conventional VLAN-aware Ethernet spanning tree protocol and auto address learning to determine which ports to unblock, and how to forward traffic. Information gathered in this way is used to populate a forwarding table at each node. In PBB, a VID identifies a virtual LAN (broadcast domain) within the carrier network 20, which may correspond to a particular customer, or some other level of granularity.

In a PBB-TE forwarding mode, a forwarding table at each of the nodes of the carrier network 20 is directly populated via a control plane or management system to store forwarding information. Different routes are identified by a combination of a B-VID and a backbone destination address (B-DA) to which the traffic is destined. Individual point-to-point connections (or trunks) using a route are defined by the combination of the B-VID, the backbone destination address (B-DA) and the backbone source address (B-SA), but the latter is never inspected during the forwarding process.

In a PLSB forwarding mode, nodes of the carrier network 20 use a link state protocol such as IS-IS to determine network topology and information gathered in this way is used to populate a forwarding table at each node. One B-VID defines a single forwarding topology which is used by all the network nodes. More than one B-VID may be used to define more than one forwarding topology for the set of network nodes; this has benefit in allowing traffic to be forwarded over more than one route between any two endpoints, for load sharing and congestion avoidance.

Figure 3:
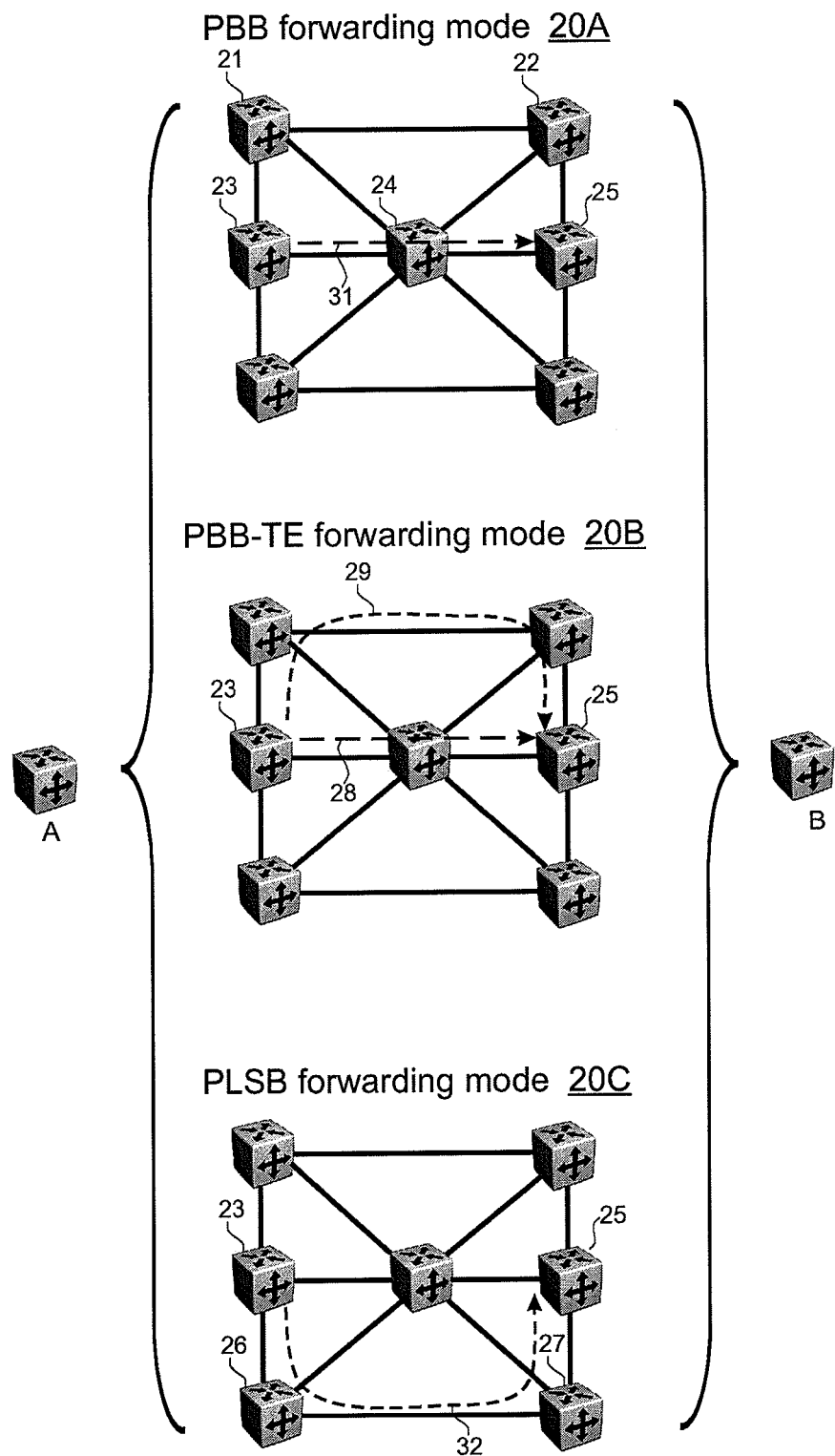
FIG. 3 shows a network in which nodes can support multiple forwarding modes.

The different forwarding modes can co-exist in the same network. FIG. 3 schematically shows the network 20 of FIG. 1 replicated three times 20A, 20B, 20C so that each of the connections can be shown more clearly. In the PBB forwarding mode, a connection has been formed between nodes 23 and 25 via node 24. In the PBB-TE forwarding mode, a working path 28 follows a route via nodes 23, 24 and 25 and a protection path 29 follows a route via nodes 23, 21, 22, 25. In the PLSB forwarding mode, a connection has been formed between nodes 23 and 25 via nodes 26, 27.

Figure 4:
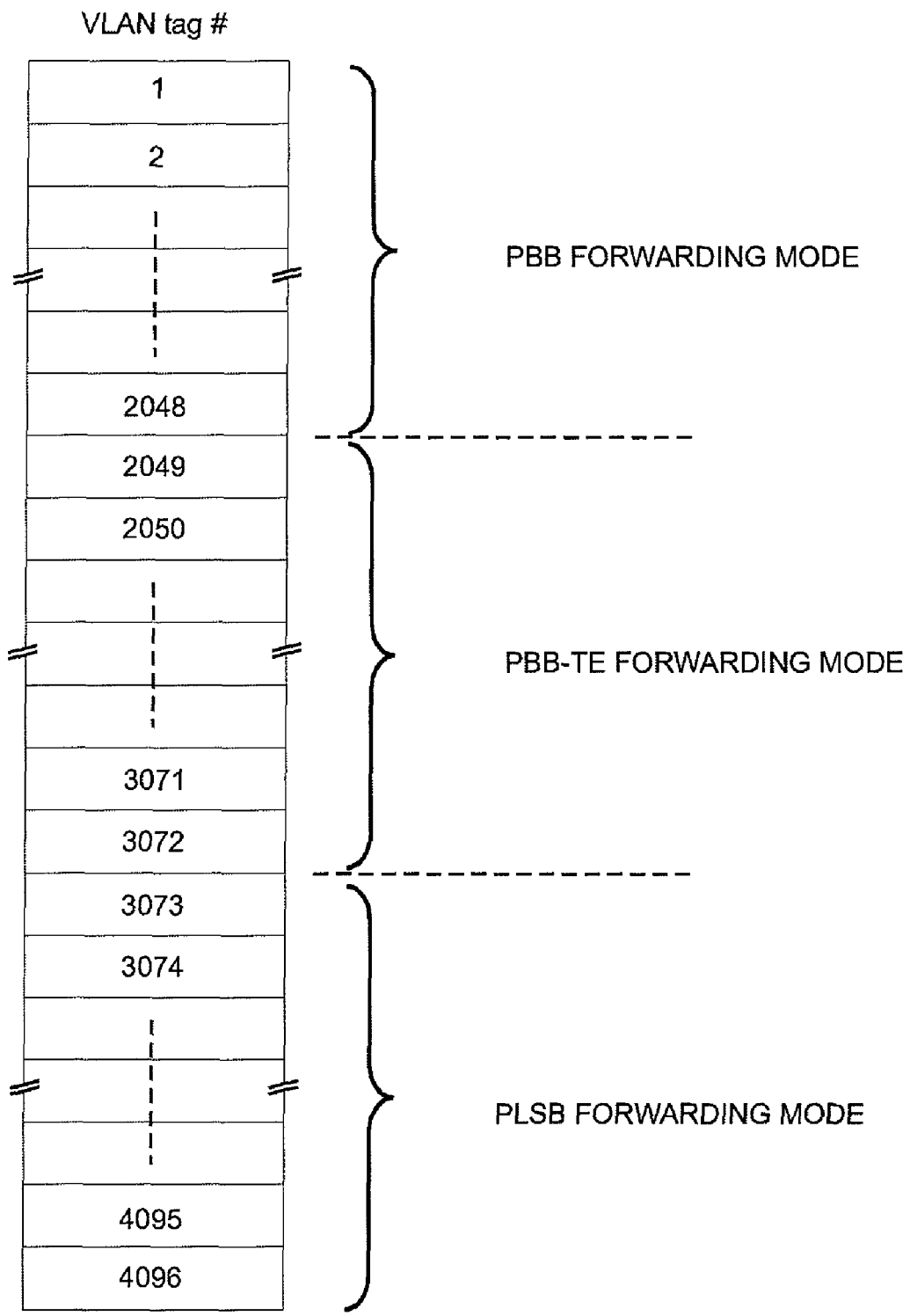
FIG. 4 shows an example allocation of VLAN Identifier (VID) values to different forwarding modes.

Each of the forwarding modes may be supported by all, or only some, of the nodes of the network 20. If a node does not support a particular forwarding mode, that node is simply ignored by other nodes which do support that forwarding mode. As an example, if a node does not support PLSB, then the process where nodes discover which other nodes they are connected to will simply not discover that node. It can be seen in FIG. 3 that one forwarding mode can establish a connection between two endpoints which duplicates the connectivity set up by another forwarding mode. The route may or may not be the same, being defined by the mechanisms of the forwarding mode which set it up. Each of the forwarding modes is allocated a different range of Backbone VLAN Identifiers, which will be referred to as B-VIDs, or simply VIDs, in the following description. There is a total of 4096 different VID values. FIG. 4 shows an example of how the total set of 4096 VID values can be allocated to different forwarding modes. It will be appreciated that each forwarding mode can be allocated any required range of VID values, and that the range allocated to each forwarding mode does not have to be contiguous. However, an important requirement is that network elements within the network are aware of the allocation and consistently apply the allocation. As an example, all nodes will only allocate VIDs in the range 2049-3072 to PBB-TE connections, and will not use a VID of any other value.

Figure 5:
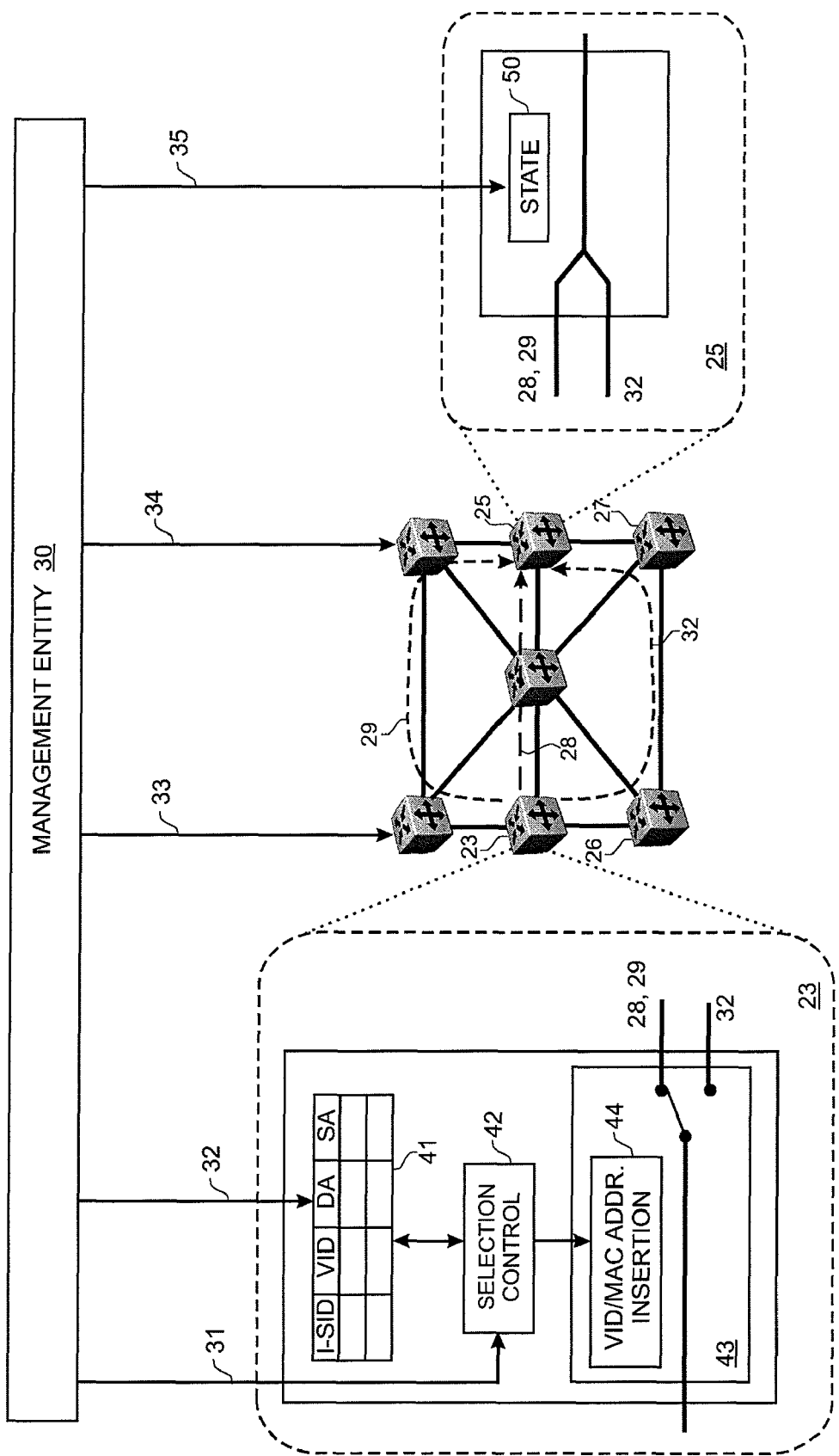
FIG. 5 shows switching of traffic between different forwarding modes.

An embodiment of the present invention addresses a scenario where it is required to evolve a network by moving traffic from a first connection, which has been configured using a first type of forwarding mode, to a second connection, which has been configured using a second type of forwarding mode. FIG. 5 shows a network in which it is required to move traffic from a first connection, which has been configured using a PBB-TE forwarding mode, to a second connection, which has been configured using a PLSB forwarding mode. In this example the first connection is a pair of PBB-TE connections: a working path 28 and a protection path 29. The PE-Edge functions of nodes 23, 25 are shown in more detail beside the respective nodes. In the PE-Edge function of node 23 a lossless switch 43 is used to switch traffic between the first connection and the second connection 32. The lossless switch 43 is schematically depicted in FIG. 5 as a switch between physical connections. In practice, the switching between forwarding modes is achieved by changing the VID value (and possibly MAC address) inserted into a packet by module 44. The switch is said to be lossless because each packet for transport over the network is always allocated either a VID value for the first connection or a VID value for the second connection; no packets are lost and no packet is duplicated. At the destination node, packets are received by the PE-Edge function of node 25 via the PBB-TE and PLSB connections. If the two connections have a different length, there may be a difference in propagation delay between the two connections. Although this can cause some mis-ordering of packets received at node 25, the mis-ordering can be easily accommodated by the use of sequence ordering carried by packets. The sequence ordering can be carried at the level of the customer traffic data packets, i.e. within header 70 of FIG. 3. If required, sequence numbering could be included at a level of the data packet recognized by the backbone switches. In this manner, received packets/frames can be re-ordered at the destination node, before forwarding to a customer. This is termed "hitless" switching.

In the description above, only the left-to-right direction of packet transfer has been described. To implement a bi-directional connection, equivalent functionality is required in the right-to-left direction. It will be apparent that, provided bidirectional connectivity is available in both forwarding modes, the switch of forwarding mode by B-VID change can be made independently in each direction, with no requirement for synchronization between the PE-Edge functions at each end of the connection.

The process for configuring the connections, and allocating VIDs, will now be described. Initially, VID ranges for each forwarding mode are configured by a network Management Entity across all participating nodes. FIG. 4 shows an example VID allocation. For PBB-TE, connections (including the VIDs) are set up by a Management action, possibly with the assistance of a Control Plane. This is shown by connections 33, 34 between the Management entity and nodes. Each PBB-TE capable node has a similar connection to the Management entity/control plane to allow state to be directly configured. Services (i.e. I-SIDs) are bound to connections by Management action. Each endpoint of a connection at a PE-Edge will receive 32 information defining a relationship between an I-SID, VID, DA and SA, and locally stores this information 41. For PBB, services are bound to VLANs (i.e. VIDs) by Management action. Each endpoint of a service at a PE-Edge will receive information defining a relationship between an I-SID and a VID. Conventional Ethernet processes of Spanning Tree Protocol and flood-and-learn in the control plane will then establish connectivity between nodes as a result of traffic flow. As described below, test/OAM packets can be sent to establish the connectivity, before carrying actual customer traffic. For PLSB, a small number of VIDs may be used. Services (I-SIDs) are installed by Management action, and are assigned automatically by a simple algorithm to a VID when they are set up (e.g. odd-even). Each endpoint of a service at a PE-Edge will receive information defining a relationship between an I-SID and a VID. As with PBB, the Control plane will install all the other state. In summary, services (I-SIDs) are configured and bound to multiple forwarding modes by Management action. The different forwarding modes have different ways of deriving forwarding state.

In one embodiment of the invention, the same I-SID is installed for two different forwarding modes, with each of the forwarding modes for that specific I-SID being associated with an active_mode/standby_mode flag. Initially, the new forwarding mode will be set to "standby mode" to allow everything to be set up in advance. When a changeover to the new forwarding mode is required for a particular service, the Management Entity can initiate the changeover by sending an instruction 31 to a selection control module 42 to reverse the flag associated with each forwarding mode for that service on all end-points A, B of the service. As an example, the table below shows a service identified by I-SID1 which has been configured with two forwarding modes: PBB-TE and PLSB. Status1 and Status2 show the two alternative settings which can be applied to the forwarding modes at different points in time. In line with the earlier discussion, the status setting is used to determine which mode each transmitting end of the connection will use. The receiving end will in practice accept from any mode on which the I-SID is set up. It is by this means that we avoid any requirement for synchronization of mode change at different endpoints, an attribute of the invention which has major operational advantages.

| Service | Forwarding Mode | Status 1 | Status 2 |
|---------|-----------------|----------|----------|
| I-SID1  | PBB-TE          | Active   | Standby  |
| I-SID1  | PLSB            | Standby  | Active   |

It is preferable to configure, and test, a new connection before moving traffic to the new connection. Referring to FIG. 5, test packets, having a B-VID value set to a value selected from the PLSB VID range, are exchanged by the PLSB-capable nodes of network 20C to establish the new connection. The connection can be tested by sending OAM packets along the new connection, such as OAM packets carrying a connectivity check (CC) message. In each of these forwarding modes, packets carrying OAM data are co-routed with packets carrying data traffic. OAM provisions are described in more detail in IEEE 802.1ag and in ITU-T Y.1731. Once the connection has been tested, live traffic can be sent along the new connection by applying the VID value of the new connection to packets at node 23. In a similar manner, connections can be configured, and tested, for any other forwarding mode and traffic can be moved between any pair of forwarding modes by appropriate selection of the VID at node 23. For example, traffic can be moved between PBB and PBB-TE, or between PBB and PLSB.

In the above example, it has been described how a VID is changed at node 23. Each service is identified by a Service Identifier (I-SID). A service will typically correspond to traffic for a particular customer. The Service Identifier will remain the same, irrespective of which forwarding mode is to be used to send the traffic. At the source PE-Edge (e.g. node 23), a look-up table is stored which relates a Service Identifier (I-SID) value to a set of alternative VID values. In carrier network 20, each node can be allocated a single MAC address or multiple MAC addresses. The MAC addresses are the backbone MAC addresses 51, 52 in FIG. 2. In the case of a single MAC address per node, it is only the VID that needs to be changed when moving traffic between connections. This is the preferred arrangement, in which the address assignment is common to all modes. Multiple MAC addresses per node can be accommodated for implementation reasons, when there may also be a need to change a MAC address at the same time as changing the VID. Accordingly, the look-up table at each node is expanded to relate a Service Identifier (I-SID) value to a set of alternative pairs of MAC address and VID value. As an example, I-SID1 can correspond to {Address=MAC1, VID1} as an endpoint of a connection in one mode, and to {Address=MAC1, VID2} as an endpoint of a connection in a second mode. In general, endpoint(s) can have different addressing granularities, and so an endpoint associated with I-SID1 will maintain state {Address=MAC1, VID1} in one mode, and {Address=MAC2, VID2} in another.

A further embodiment of the present invention addresses a scenario where it is required to evolve a network by modifying software at nodes of the network. Software updates may fix bugs, or add new functionality to a node. A method of modifying software will now be described. It is assumed that a first connection has already been configured, and is in use, which is allocated a first VID (=VID1) and that nodes use a first software release. The method proceeds as follows:

update software at one or more nodes of the network, to a second software release. Before activating this software, it is configured to use a different VID or VID range from that being used by the first software release;

configure a new connection through the network via a set of nodes. The new connection is allocated a different VID (=VID2), which selected from the VID range allocated to the second software release. The new connection may use the same set of nodes as the first connection, or some or all of the intermediate nodes between the source node and destination node may differ;

test the new connection, by sending test/OAM packets with the VID set=VID2. The second software release is used to process test packets sent via the new connection with VID=2;

if the tests indicate that the new connection, which has been processed by nodes operating the new software release, is OK, move real customer traffic to the new connection by changing the VID applied to packets carrying the customer traffic to VID2.

The functionality shown in FIG. 5 at nodes 23, 25 can also be used to implement this embodiment of the invention.

Using the above method, the stability of the updated software can be tested before live traffic is sent via the updated nodes. Furthermore, the changeover between the old connection and the new connection is seamless, and traffic can be reverted to the old connection at any point. In this example the first and second software releases implement the same forwarding mode, and VID1 and VID2 are VIDs selected from a VID range allocated to the same forwarding mode, e.g. both VIDs represent PBB-TE connections. This is the most likely scenario, although it is within the scope of the invention that the software releases implement different forwarding modes, and the VIDs are selected from VID ranges corresponding to different forwarding modes. Nodes which simultaneously execute the first and second software releases typically have two processors, or a processing resource which can be partitioned or shared between the tasks of executing the first software release and the second software release.

In the above description, the term "connection" has been used to generally represent both any-to-any connectivity and point-to-point connections. It will be apparent to those skilled in the art that the invention applies to the migration of services between forwarding modes which support any-to-any (LAN segment) connectivity (e.g. PBB to PLSB, which both support this), as well as to migration of strictly point-to-point connections as supported by PBB-TE.

The invention is not limited to the embodiments described herein, which may be modified or varied without departing from the scope of the invention.

We claim:

1. A method of transferring packets across an Ethernet network comprising a plurality of nodes, the network supporting a plurality of different forwarding modes, the method comprising:

allocating a range of VLAN Identifiers (VIDs) to each of the forwarding modes, each forwarding mode making a different use of a VID within a header of a packet;

configuring a first connection between a source node and a destination node of the network using a first forwarding mode and a VID in the packet having a first value selected from a first range of VIDs, the first forwarding mode being Provider Backbone Bridging (PBB);

configuring a second connection between the source node and the destination node of the network using a second forwarding mode and a VID in the packet having a second value selected from a second range of VIDs, second forwarding mode being Provider Link State Bridging (PLSB); and sending packets carrying data traffic to the destination node by selectively:

setting a VID in a packet to the first value, to transfer the packet via the first connection and the first forwarding mode; and, setting a VID in a packet to the second value to transfer the packet via the second connection and the second forwarding mode.

2. The method according to claim 1 wherein the step of configuring the second connection comprises testing operation of the second connection by sending test packets before sending a packet carrying data traffic over the second connection.

3. The method according to claim 1 wherein the step of configuring the second connection comprises sending test packets which nodes can use to learn the topology of the network and form the second connection before sending packets carrying data traffic over the second connection.

4. The method according to claim 1 wherein data traffic flows are identified by service identifiers, the method further comprising:
  storing a look-up table relating a service identifier to a VID value for each of the first connection and the second connection.

5. The method according to claim 4 wherein at least one of: the source node and the destination node has a plurality of MAC addresses, the method further comprising:
  storing a look-up table relating a service identifier to a combination of a MAC address and a VID value for each of the first connection and the second connection; and,
  setting a VID and a MAC address when sending a packet carrying traffic to the destination node of the network.

6. The method according to claim 1 wherein packets sent via the first and second connections each carry a data payload, and wherein a packet sent via one of the connections carries a data payload which is contiguous to a data payload carried in a packet sent via the other of the connections.

7. The method according to claim 1 wherein the destination node accepts packets from the first connection and the second connection in the order in which they arrive at the destination node.

8. A method of transferring packets across an Ethernet network comprising a plurality of nodes, the network supporting a plurality of different forwarding modes, wherein a range of VLAN Identifiers (VIDs) has been allocated to each of the forwarding modes, each forwarding mode making a different use of a VID within a header of a packet, the method comprising, at a first node:
  receiving a first association between a service identifier for data traffic and a VID having a first value corresponding to a first forwarding mode, the first forwarding mode being Provider Backbone Bridging (PBB);
  receiving a second association between the service identifier for data traffic and a second VID having a second value corresponding to a second forwarding mode, second forwarding mode being Provider Link State Bridging (PLSB); and
  selectively sending packets carrying data traffic to the destination node by setting a VID in the packet to the first value, to transfer the packet via a first connection using the first forwarding mode, and setting a VID in a packet to the second value to transfer the packet via a second connection using the second forwarding mode.

9. A The method according to claim 8 further comprising receiving an instruction of which connection is to be used, and selecting one of the VIDs based on the received instruction.

10. A The method according to claim 8 further comprising sending test packets with a VID set to the second value to test the second connection before sending packets carrying data traffic over the second connection.

11. A The method according to claim 8 further comprising sending test packets which nodes can use to learn the topology of the network and form the second connection before sending packets carrying data traffic over the second connection.

12. A The method according to claim 8 further comprising receiving an instruction of which forwarding mode to use to send the data traffic.

13. A computer program product comprising a non-transitory machine-readable medium bearing instructions which, when executed by a processor, cause the processor to implement the method of claim 1.

14. A method of transferring packets across an Ethernet network comprising a plurality of nodes, the method comprising:
  configuring a first connection between a source node and a destination node of the network via a first set of nodes of the network, the first set of nodes using a first release of functionality to implement a first packet forwarding mode, the first connection being allocated a VLAN Identifier (VID) having a first value, the first release of functionality including Provider Backbone Bridging (PBB) functionality;
  installing a second release of functionality to implement a second packet forwarding mode at at least one node of a second set of nodes, the second release of functionality including Provider Link State Bridging (PLSB) functionality;
  configuring a second connection between the source node and the destination node of the network via the second set of the nodes of the network, the second connection being allocated a VLAN Identifier (VID) having a second value;
  sending packets carrying data traffic to the destination node by selectively:
  setting a VID in a packet to the first value, to transfer the packet via the first connection, and
  setting a VID in the packet to the second value to transfer the packet via the second connection.

15. The method according to claim 14 wherein the step of configuring the second connection comprises testing operation of the second connection by sending test packets before the step of sending the second packet carrying traffic.

16. The method according to claim 14 wherein the first set of nodes and the second set of nodes are equal.

17. The method according to claim 14 wherein each release of functionality is allocated a different range of VIDs.

18. The method according to claim 14 wherein the first release of functionality to implement a packet forwarding mode and the second release of functionality to implement the packet forwarding mode are software releases.

19. A computer program product comprising a non-transitory machine-readable medium bearing instructions which, when executed by a processor, cause the processor to implement the method of claim 14.

* * * * *

UNITED STATES PATENT AND TRADEMARK OFFICE
CERTIFICATE OF CORRECTION

| | | |
|---|---|---|
| PATENT NO. | : 8,005,081 B2 | Page 1 of 1 |
| APPLICATION NO. | : 11/962476 | |
| DATED | : August 23, 2011 | |
| INVENTOR(S) | : Bragg et al. | |

It is certified that error appears in the above-identified patent and that said Letters Patent is hereby corrected as shown below:

In Column 11, line 46, Claim 9, delete "A".

In Column 11, line 49, Claim 10, delete "A".

In Column 11, line 53, Claim 11, delete "A".

In Column 12, line 4, Claim 12, delete "A".

In Column 12, line 36, Claim 14, replace "the" with --a--.

Signed and Sealed this
Eleventh Day of October, 2011

David J. Kappos
*Director of the United States Patent and Trademark Office*